United States Patent
Watanabe et al.

(10) Patent No.: US 10,045,268 B2
(45) Date of Patent: Aug. 7, 2018

(54) WIRELESS BASE STATION, TRAFFIC LOAD-BALANCING METHOD, AND STORAGE MEDIUM WITH PROGRAM STORED THEREON

(71) Applicant: NEC Corporation, Tokyo (JP)

(72) Inventors: Tomohiro Watanabe, Tokyo (JP); Yasuhiko Matsunaga, Tokyo (JP); Atsushi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 15/031,480

(22) PCT Filed: Oct. 21, 2014

(86) PCT No.: PCT/JP2014/005330
§ 371 (c)(1),
(2) Date: Apr. 22, 2016

(87) PCT Pub. No.: WO2015/064054
PCT Pub. Date: May 7, 2015

(65) Prior Publication Data
US 2016/0262072 A1 Sep. 8, 2016

(30) Foreign Application Priority Data
Oct. 28, 2013 (JP) ................................. 2013-222924

(51) Int. Cl.
*H04W 36/22* (2009.01)
*H04W 28/02* (2009.01)
*H04L 12/803* (2013.01)

(52) U.S. Cl.
CPC ........... *H04W 36/22* (2013.01); *H04L 47/125* (2013.01); *H04W 28/02* (2013.01); *H04W 28/0236* (2013.01)

(58) Field of Classification Search
CPC ............................ H04L 45/24; H04Q 11/0478
See application file for complete search history.

(56) References Cited

U.S. PATENT DOCUMENTS 7,756,043 B1 * 7/2010 Nucci ................... H04L 41/142
370/238
2012/0120824 A1 5/2012 Meylan et al.
(Continued)

FOREIGN PATENT DOCUMENTS

JP 2009-206769 A 9/2009
JP 2011-171994 A 9/2011
(Continued)

OTHER PUBLICATIONS

Extended European Search Report issued by the European Patent Office for European Application No. 14859186.0 dated Feb. 27, 2017 (16 pages).
(Continued)

*Primary Examiner* — Chandrahas B Patel
(74) *Attorney, Agent, or Firm* — Wilmer Cutler Pickering Hale and Dorr LLP (57) ABSTRACT

[Problem] To provide a wireless base station, a traffic load-balancing method, and a traffic load-balancing program that make it possible to more reliably avoid backhaul congestion and decreases in wireless-terminal throughput. [Solution] This wireless base station includes the following: a setting unit (14) that sets network load information that indicates the traffic load on a backhaul between the wireless base station and a core network; and an execution unit (15) that, on the basis of the network load information set by the setting unit and network load information received from a neighboring wireless base station, executes a process that balances the traffic load between the wireless base stations.

7 Claims, 9 Drawing Sheets

(56) References Cited

U.S. PATENT DOCUMENTS

2013/0072212 A1     3/2013    Nakamura et al.
2013/0095811 A1     4/2013    Okino

FOREIGN PATENT DOCUMENTS

| | | |
|---|---|---|
| JP | 2011-250213 A | 12/2011 |
| JP | 2013-532430 A | 8/2013 |
| WO | WO-2011/052643 A1 | 5/2011 |
| WO | WO-2011/157486 A1 | 12/2011 |
| WO | WO-2011/158862 A1 | 12/2011 |
| WO | WO-2012/105881 A1 | 8/2012 |

OTHER PUBLICATIONS

Japanese Office Action issued by the Japan Patent Office for Japanese Application No. 2015-544786 dated Apr. 4, 2017 (3 pages).

Sommers, J., et al., "A Proposed Framework for Calibration of Available Bandwidth Estimation Tools," Proceedings of the 11th IEEE Symposium on Computers and Communications, Author Manuscript—Computer Sciences Department, University of Wisconsin Madison, Technical Report #1546 dated Dec. 2005 (11 pages).

Stein, Yaakov, "[ippm]"secret sauce, IETF ippm working group mailing list dated Jul. 25, 2011, XP055341901, (2 pages).

Suthaharan, S. and Kumar, S., "Measuring Available Bandwidth: pathChirp's Chirp Train Structure Remodeled," IEEE Telecommunication Networks and Applications Conference, XP031424761, Piscataway, NJ, USA, pp. 379-384 (Dec. 7, 2008).

Yanping, C., et al., "An Improved IGI Available Bandwidth Probing Technique," 2009 1st International Conference on Information Science and Engineering (ICISE), IEEE, XP031663580, Piscataway, NJ, USA, pp. 1655-1658 (Dec. 26-28, 2009).

International Search Report corresponding to PCT/JP2014/005330 dated Jan. 20, 2015 (2 pages).

\* cited by examiner

| PACKET LOSS RATE / DELAY VARIATION | 0~0.01 | 0.01~0.05 | 0.05~ |
|---|---|---|---|
| 0~1msec | low | Medium | High |
| 1~5msec | Medium | Medium | High |
| 5msec~ | High | High | Overload |

Fig. 6

| IE/Group Name | Range |
|---|---|
| Message Type | |
| eNB1 Measurement ID | |
| ⋮ | ⋮ |
| >Cell Measurement Result Item | |
| >>Cell ID | |
| >>Hardware Load Indicator | |
| >>S1 TNL Load Indicator | |
| >>Packet Loss Rate | |
| >>Delay Variation | |

Fig. 7

| PACKET LOSS RATE / DELAY VARIATION | 0~0.001 | 0.001~0.005 | 0.005~ |
|---|---|---|---|
| 0~0.01msec | low | Medium | High |
| 0.01~0.05msec | Medium | Medium | High |
| 0.05msec~ | High | High | Overload |

Fig. 8

| PACKET LOSS RATE / DELAY VARIATION | 0~0.05 | 0.05~0.1 | 0.1~ |
|---|---|---|---|
| 0~10msec | low | Medium | High |
| 10~50msec | Medium | Medium | High |
| 50msec~ | High | High | Overload |

| IE/Group Name | Semantics description |
|---|---|
| Message Type | |
| eNB1 Measurement ID | Allocated by $eNB_1$ |
| eNB2 Measurement ID | Allocated by $eNB_2$ |
| Registration Request | A value set to "stop", indicates a request to stop all cells measurements. |
| Report Characteristics | Each position in the bitmap indicates measurement object the eNB2 is requested to report.<br>First Bit = PRB Periodic,<br>Second Bit = TNL load Ind Periodic, ··· |
| ⋮ | ⋮ |

Fig. 13

| IE/Group Name | Range |
|---|---|
| Message Type | |
| eNB1 Measurement ID | |
| ⋮ | ⋮ |
| >Cell Measurement Result Item | |
| >>Cell ID | |
| >>Hardware Load Indicator | |
| >>S1 TNL Load Indicator | |

WIRELESS BASE STATION, TRAFFIC LOAD-BALANCING METHOD, AND STORAGE MEDIUM WITH PROGRAM STORED THEREON

CROSS-REFERENCE TO RELATED APPLICATIONS

This application is a national stage application of International Application No. PCT/JP2014/005330 entitled "Wireless Base Station, Traffic Load-Balancing Method, and Storage Medium with Program Stored Thereon" filed on Oct. 21, 2014, which claims priority to Japanese Application 2013-222924 filed on Oct. 28, 2013, the disclosures of which are hereby incorporated by reference in their entirety.

TECHNICAL FIELD

The present invention relates to a radio base station, a traffic load distribution method, and a storage medium storing a traffic load distribution program, that distributes traffic loads among base stations.

BACKGROUND ART

Figure 10:
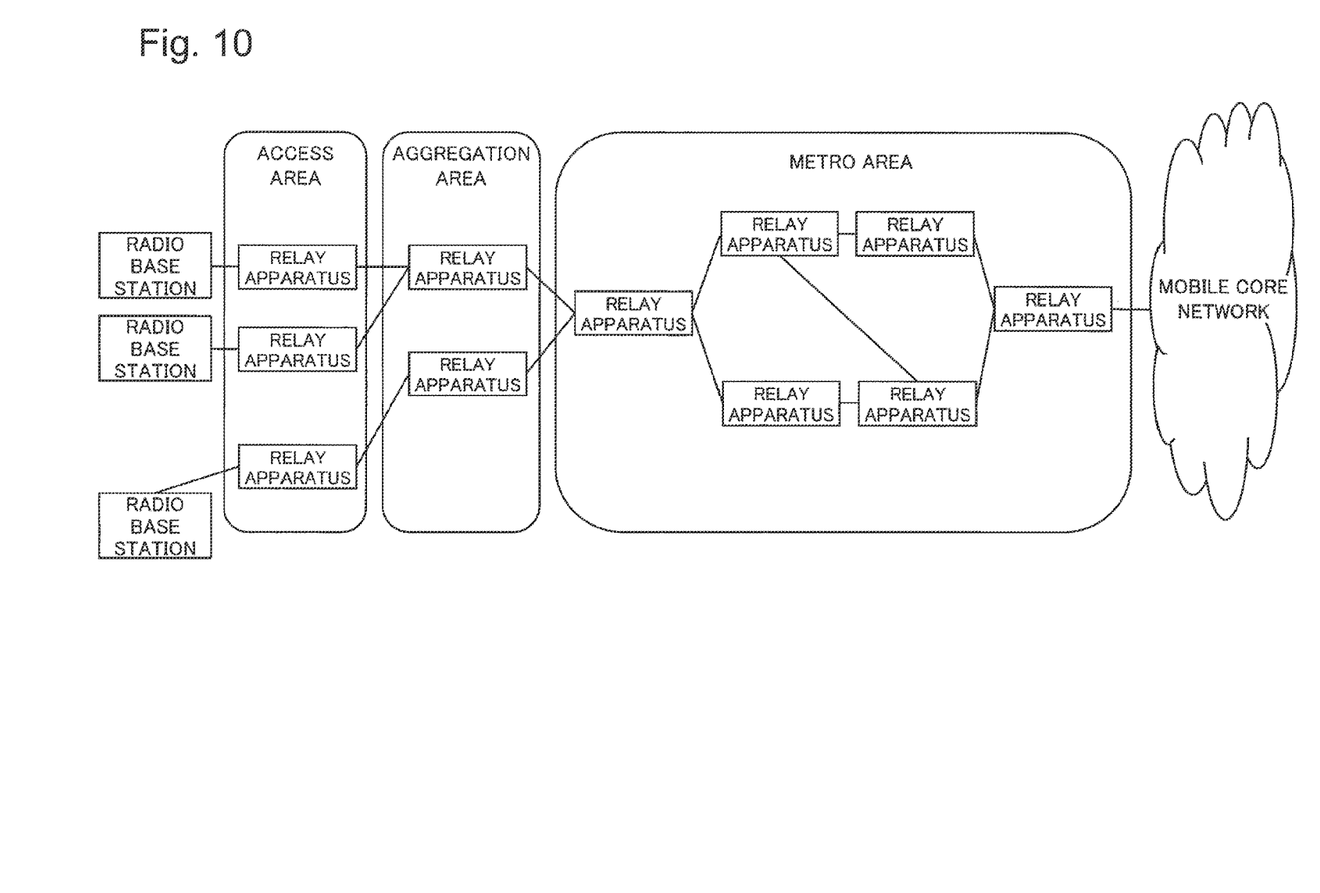
FIG. 10 is an illustrative diagram illustrating one example of a mobile backhaul.

A backhaul (hereinafter, referred to as a mobile backhaul) between radio base stations and a mobile core network may include a plurality of links. FIG. 10 is a block diagram illustrating one example of the mobile backhaul. The mobile backhaul is divided into an access link, an aggregation link, and a metro link. The access link is a link that accommodates a radio base station connected to a relay apparatus disposed in an access area. The aggregation link is a link that accommodates a plurality of radio base stations connected to relay apparatuses disposed in the access area and a radio base station (not illustrated in FIG. 10) disposed in an aggregation area. The metro link is a link in a metro area and is a link to transfer a large amount of mobile data traffic of the plurality of radio base stations transferred via the aggregation link to a mobile core network. Hereinafter, a communication resource in the backhaul will be referred to as a backhaul resource. Further, a traffic load in the backhaul resource will be referred to as a backhaul resource load.

As a method for distributing backhaul resource loads, there is, for example, MLB (Mobility Load Balancing) executed between eNBs (evolved Node Bs). The eNB is a radio base station corresponding to LTE (Long Term Evolution). MLB is executed in accordance with procedures indicated in 1 to 4 described below.

1. Via an X2 link between eNBs, there is executed resource status reporting processing, specifically, Resource Status Reporting Initiation Procedure described in technical specifications (TS 36.423 Version 11.5.0) of 3GPP (3rd Generation Partnership Project).

Figure 11:
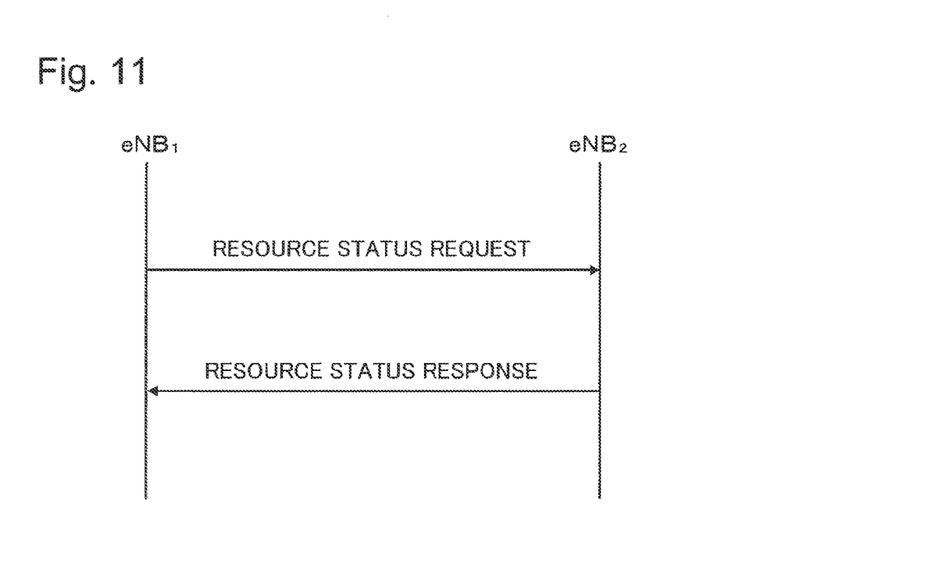
FIG. 11 is a sequence diagram illustrating resource status reporting processing between eNBs.

FIG. 11 is a sequence diagram illustrating resource status reporting processing between eNBs. In the resource status reporting processing, as illustrated in FIG. 11, a resource status request message (X2: RESOURCE STATUS REQUEST message) is transmitted from an eNB 1 to an eNB adjacent thereto (hereinafter, referred to as an adjacent eNB), i.e. an eNB 2. Then, from the eNB 2 to the eNB 1, a response message (X2: RESOURCE STATUS RESPONSE message) to the resource status request message is transmitted.

Figure 12:
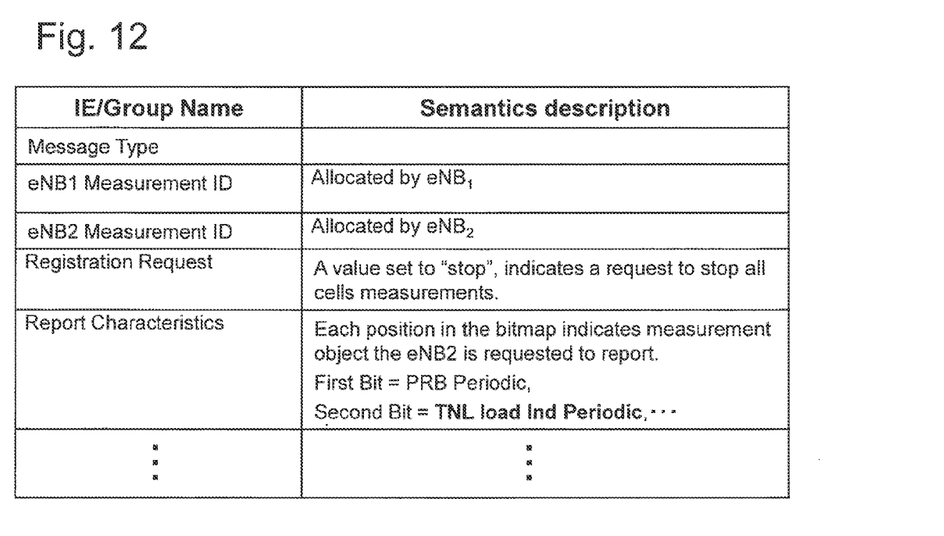
FIG. 12 is an illustrative diagram illustrating a structure of a RESOURCE STATUS REQUEST message.

FIG. 12 is an illustrative diagram illustrating a structure of the RESOURCE STATUS REQUEST message. The eNB 1 designates load information of the adjacent eNB (eNB 2) that establishes an X2 link as a measurement object in the RESOURCE STATUS REQUEST message. Specifically, as illustrated in FIG. 12, the eNB 1 designates "TNL (Transport Network Layer) load Ind Periodic" as the parameter "Report Characteristics (measurement object items)" of the RESOURCE STATUS REQUEST message. Thereby, the eNB 1 becomes able to periodically receive load information of the eNB 2. It should be noted that in "Report Characteristics," up to four pieces of load information can be designated. In the present example, as one thereof, "TNL load Ind Periodic" is included.

2. The eNB 1 receives a resource status update message (X2: RESOURCE STATUS UPDATE message) from the adjacent eNB.

Figure 13:
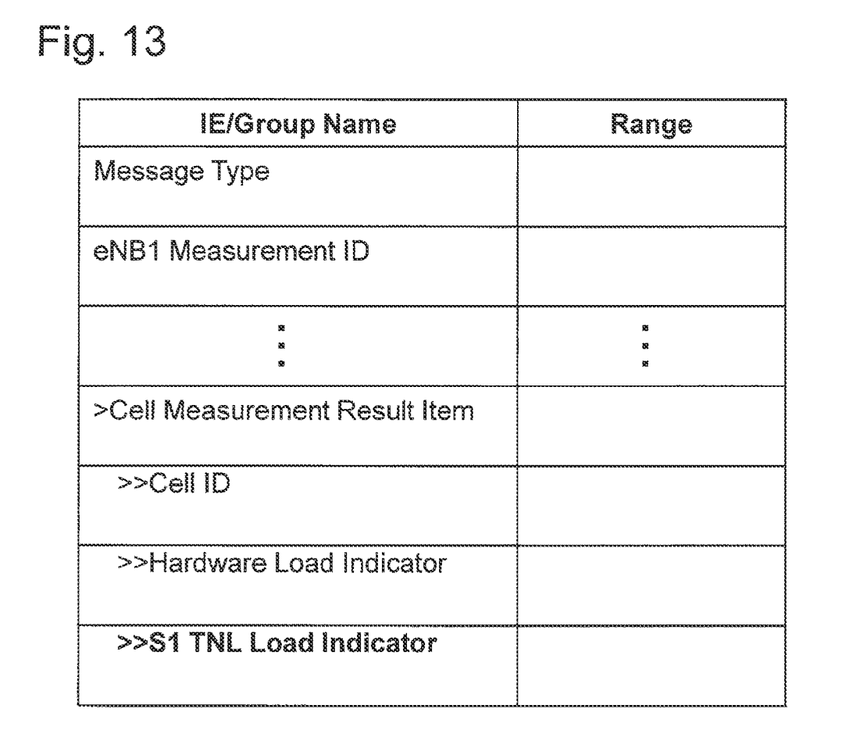
FIG. 13 is an illustrative diagram illustrating a structure of a RESOURCE STATUS UPDATE message.

FIG. 13 is an illustrative diagram illustrating a structure of the RESOURCE STATUS UPDATE message. The RESOURCE STATUS UPDATE message received by the eNB 1 includes "S1 TNL Load Indicator" as illustrated in FIG. 13. "S1 TNL Load Indicator" is load information of an S1 transport network layer (hereinafter, referred to as S1 network load information). The S1 network load information is information indicating a backhaul resource load of a link, i.e. an access link between an eNB and a first-hop relay apparatus from the eNB. A value of the S1 network load information is indicated by any one of four stages of "LowLoad," "MediumLoad," HighLoad," and "Overload."

3. The eNB 1 changes, when a load of TNL exceeds a certain threshold, a handover attribute value (a value of a parameter for controlling Handover described in the technical specifications) to switch a cell where a radio terminal is located from a cell of the eNB 1 to a cell of an adjacent eNB having a low load, i.e. to execute Handover. At that time, the eNB 1 designates the cell of the adjacent eNB having a low load as a handover destination on the basis of the S1 network load information received from the adjacent eNB. Herein, it is assumed that the eNB 1 designates a cell of the eNB 2.

4. The eNB 1 handovers the cell where the radio terminal is located from the cell of the eNB 1 to the cell of the eNB 2 to distribute backhaul resource loads.

PTL 1 describes a technique in which in a radio communication system where an eNB communicates using a plurality of carriers, the eNB exchanges carrier configuration information, load information, and a resource usage status with another eNB to avoid inter-cell interference and execute load distribution among carriers.

CITATION LIST

Patent Literature

[PTL 1] International Publication No. WO2011/052643

SUMMARY OF INVENTION

Technical Problem

Here, it is assumed that the eNB 1 and the eNB 2 use access links differing from each other. Further, it is assumed that aggregation links located ahead of the access links used by the eNB 1 and the eNB 2, respectively, are the same and also, in the aggregation link, a backhaul resource load increases and congestion occurs.

When a backhaul resource load of the access link used by the eNB 1 is high and a backhaul resource load of the access link used by the eNB 2 is light, a load distribution function works in each eNB. In other words, the procedures 3 to 4 are executed. Thereby, the cell where the radio terminal is located is handovered from the cell of the eNB 1 to the cell of the eNB 2. As a result, the backhaul resource loads in the access links are distributed. However, in the aggregation link, the backhaul resource load is unchanged and therefore, congestion is not eliminated. Therefore, it is difficult to avoid a throughput decrease of the radio terminal in the cell of the eNB 2 of the handover destination. The reason is that a value indicated by "S1 TNL Load Indicator" included in the RESOURCE STATUS UPDATE message indicates a backhaul resource load of the access link. In other words, load distribution considering load information of the aggregation link is not executed.

An eNB can acquire load information of a link from a management apparatus (NMS (Network Management System)) that manages backhaul resources between the eNB and a mobile core network. However, in some cases, the NMS does not manage all links between the eNB and the mobile core network. For example, the NMS may manage only a backhaul of an access link. In such a case, it is difficult for the eNB to know load information of a link having a highest load, i.e. a bottleneck link between the eNB and the mobile core network. As a result, even when the eNB can acquire load information of a link from the NMS, it may be difficult to avoid backhaul congestion and a throughput decrease of a radio terminal.

Accordingly, the present invention is intended to provide a radio base station, a traffic load distribution method, and a storage medium storing a traffic load distribution program, that can more certainly avoid backhaul congestion and a throughput decrease of a radio terminal.

Solution to Problem

A radio base station, according to the present invention, comprises:

a determination means for generating network load information indicating a traffic load in a backhaul between an own station and a core network; and an execution means for executing distribution of traffic loads among radio base stations on the basis of the network load information generated by the determination means and network load information received from an adjacent radio base station.

A traffic load distribution method, according to the present invention, comprises:

determining network load information indicating a traffic load in a backhaul between an own station and a core network; and executing distribution of traffic loads among radio base stations on the basis of the determined network load information and network load information received from an adjacent radio base station.

A non-transitory storage medium according to the present invention stores a traffic load distribution program, that causes a computer to execute:

processing for determining network load information indicating a traffic load in a backhaul between an own station and a core network; and processing for executing distribution of traffic loads among radio base stations on the basis of the determined network load information and network load information received from an adjacent radio base station.

Advantageous Effects of Invention

According to the present invention, it is possible to more certainly avoid backhaul congestion and a throughput decrease of a radio terminal.

DESCRIPTION OF EMBODIMENTS

First Exemplary Embodiment

A first exemplary embodiment of the present invention will be described with reference to the drawings.

Figure 1:
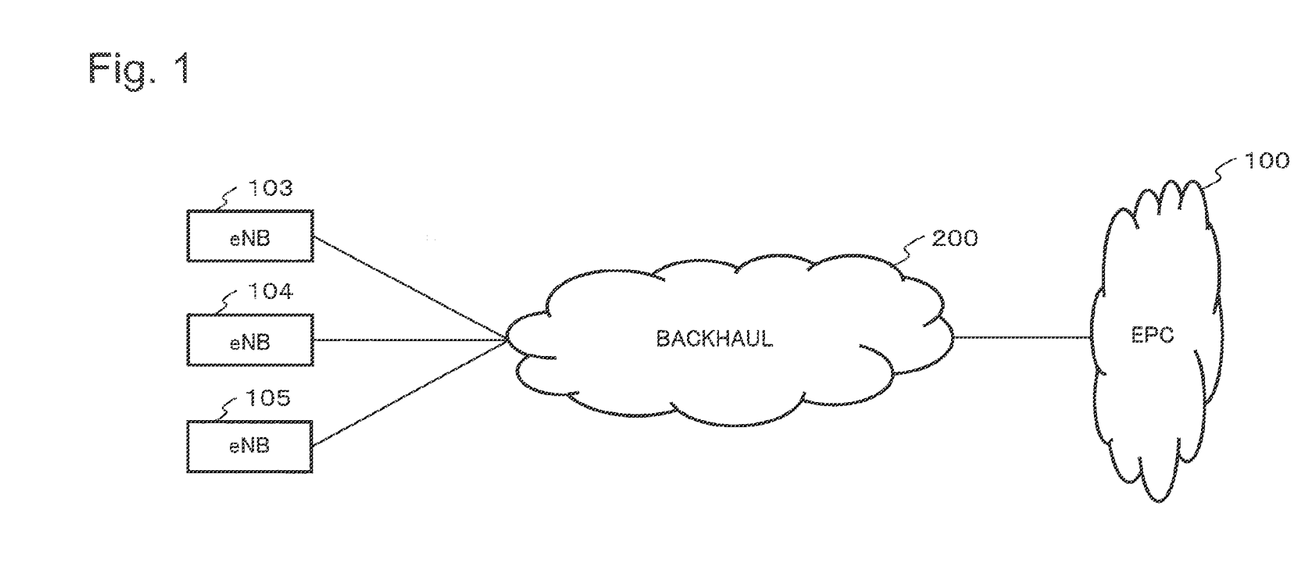
FIG. 1 is a block diagram illustrating an outline of a radio communication network including a radio base station according to the present invention.

FIG. 1 is a block diagram illustrating an outline of a radio communication network including a radio base station according to the present invention. As illustrated in FIG. 1, the radio base station (eNBs 103 to 105) according to the present invention is connected to an EPC (Evolved Packet Core) network (hereinafter, referred to simply as an EPC) 100 that is a mobile core network via a backhaul 200.

Figure 2:
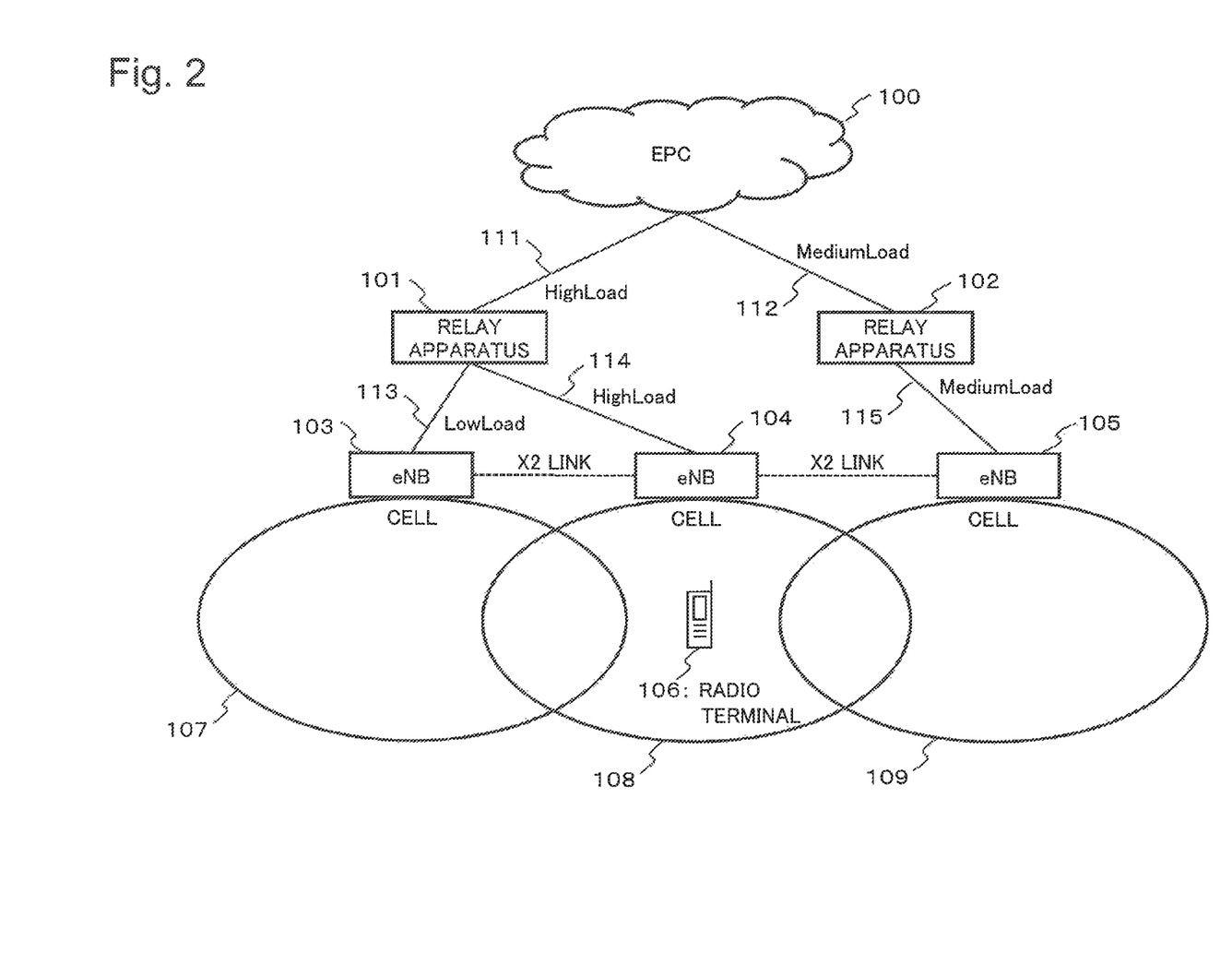
FIG. 2 is a block diagram illustrating one example of a configuration of the radio communication network illustrated in FIG. 1.

FIG. 2 is a block diagram illustrating one example of a configuration of the radio communication network illustrated in FIG. 1. In the example illustrated in FIG. 2, the eNBs 103 to 105 each are connected to the EPC 100 via links 111 to 115 and relay apparatuses 101 to 102. In other words, the links 111 to 115 are equivalent to the backhaul 200 illustrated in FIG. 1. The eNB 103 and the eNB 104 are connected to the relay apparatus 101. The eNB 105 is connected to the relay apparatus 102. Further, the relay apparatuses 101 to 102 are connected to the EPC 100. The eNB 103 and the eNB 104, and the eNB 104 and the eNB 105 are connected via an X2 link, respectively. It should be noted that in FIG. 2, two relay apparatuses and three eNBs are exemplified, but any number of relay apparatuses and eNBs may be provided.

Here, it is assumed that a radio terminal 106 is located in a cell of the eNB 104 (a cell 108 illustrated in FIG. 2). The radio terminal 106 is connected to the EPC 100 via the eNB 104 and the relay apparatus 101. Further, a state of a backhaul resource load in the link 111 that connects the EPC 100 and the relay apparatus 101 is "HighLoad." A state of a backhaul resource load in the link 112 that connects the EPC 100 and the relay apparatus 102 is "MediumLoad." A state of a backhaul resource load in the link 113 that connects the relay apparatus 101 and the eNB 103 is "LowLoad." A state of a backhaul resource load in the link 114 that connects the relay apparatus 101 and the eNB 104 is "HighLoad." A state of a backhaul resource load in the link 115 that connects the relay apparatus 102 and the eNB 105 is "MediumLoad."

For example, "S1 TNL Load Indicator," i.e. a value of S1 network load information received by the eNB 104 from the eNB 103 indicates the backhaul resource load of the link 113. Therefore, the eNB 104 acquires "LowLoad" as the value of S1 network load information of the eNB 103. In the similar manner, a value of S1 network load information received by the eNB 103 from the eNB 104 is "HighLoad." Further, a value of S1 network load information received by the eNB 104 from the eNB 105 is "MediumLoad."

Here, it is assumed that the eNB 103, the eNB 104, and the eNB 105 share respective pieces of load information and the eNBs determine which adjacent cell is designated as a handover destination of the radio terminal 106 on the basis of values indicated by the respective pieces of load information. Herein, the eNBs are assumed to share only S1 network load information. At that time, when a load of the eNB 104 increases to some extent, the eNB 104 determines a cell of the eNB 103 (a cell 107 illustrated in FIG. 2) as a handover destination since the value of S1 network load information of the eNB 103 is "LowLoad."

Figure 3:
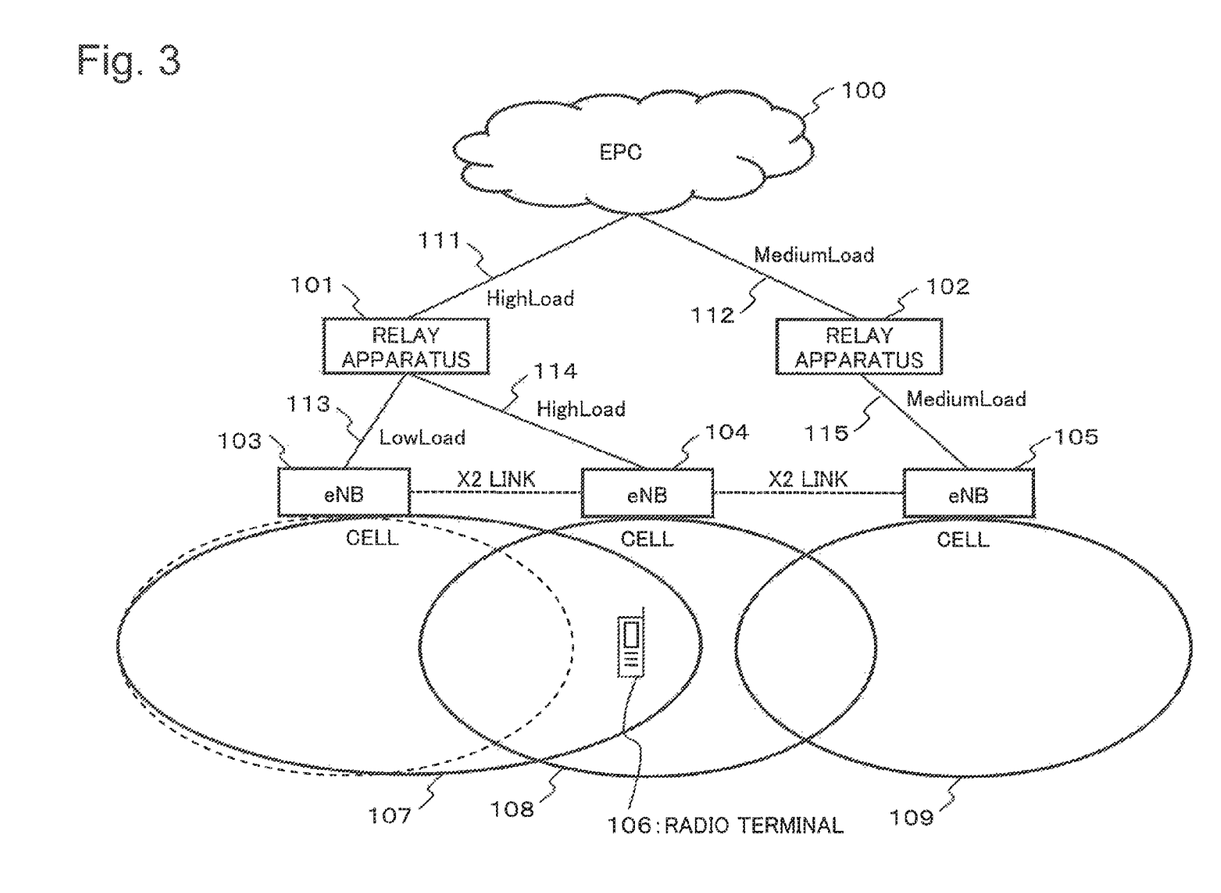
FIG. 3 is an illustrative diagram illustrating how an eNB handovers a radio terminal from a cell where the radio terminal is located to another cell.

FIG. 3 is an illustrative diagram illustrating how the eNBs 103 to 104 handover a radio terminal from a cell where the radio terminal is located (the cell 108) to another cell (the cell 107). As illustrated in FIG. 3, in order to easily handover the radio terminal 106 from the cell 108 to the cell 107, the eNB 103 and the eNB 104 cooperate to change a setting of a handover attribute value. In other words, the eNB 103 and the eNB 104 each change a setting of a handover attribute value and move a handover boundary to cause the cell 107 to become a handover destination. An area of the cell 107 prior to the change of the handover attribute value is illustrated using a dashed line in FIG. 3. When the radio terminal 106 is located in the cell 107, a backhaul resource load of the link 114 is reduced and a backhaul resource load of the link 113 is increased. Thereby, the loads are distributed between the link 113 and the link 114. However, a backhaul resource load of the link 111 which aggregates the link 113 and the link 114 is originally "HighLoad." Therefore, even when the loads are distributed between the link 113 and the link 114, the load of the link 111 is not reduced and remains "HighLoad." Therefore, even when the cell where the radio terminal 106 is located is handovered, it may be difficult to avoid a throughput decrease of the radio terminal 106.

As an optimization method of MLB, there is "Enhanced Mobility Load Balancing Optimization in LTE" presented by NSN (Nokia Solutions and Networks) at an international symposium (2012 IEEE 23rd International Symposium on Personal, Indoor and Mobile Radio Communications—(PIMRC)). In this optimization method, a cell of a handover destination is determined based on a frequency band utilizable for each adjacent radio base station. Here, the frequency band utilizable for each adjacent radio base station is defined by a difference between all of the transport capacities allocated to radio base stations and a GBR (Guaranteed Bit Rate) sum of active bearers. The GBR sum of active bearers is a sum of GBRs of the active bearers including a communication overhead based on S1 Interface protocol.

The optimization method uses a transport capacity considering only a backhaul resource load of a link, i.e. an access link between a radio base station and a first-hop relay apparatus from the radio base station. Therefore, the optimization method does not consider backhaul resource loads of an aggregation link located ahead of the access link. A case in which a backhaul resource load of the aggregation link located ahead of the access link is considered and a case in which the above matter is not considered are different in a frequency band defined by a difference between a transport capacity and a GBR sum of active bearers. As a result, even when on the basis of the optimization method, MLB is executed between radio base stations, it is difficult to avoid aggregation link congestion and a throughput decrease of a radio terminal.

Accordingly, the radio base station (the eNBs 103 to 105) according to the present invention executes MLB considering a backhaul resource load in an aggregation link.

Figure 4:
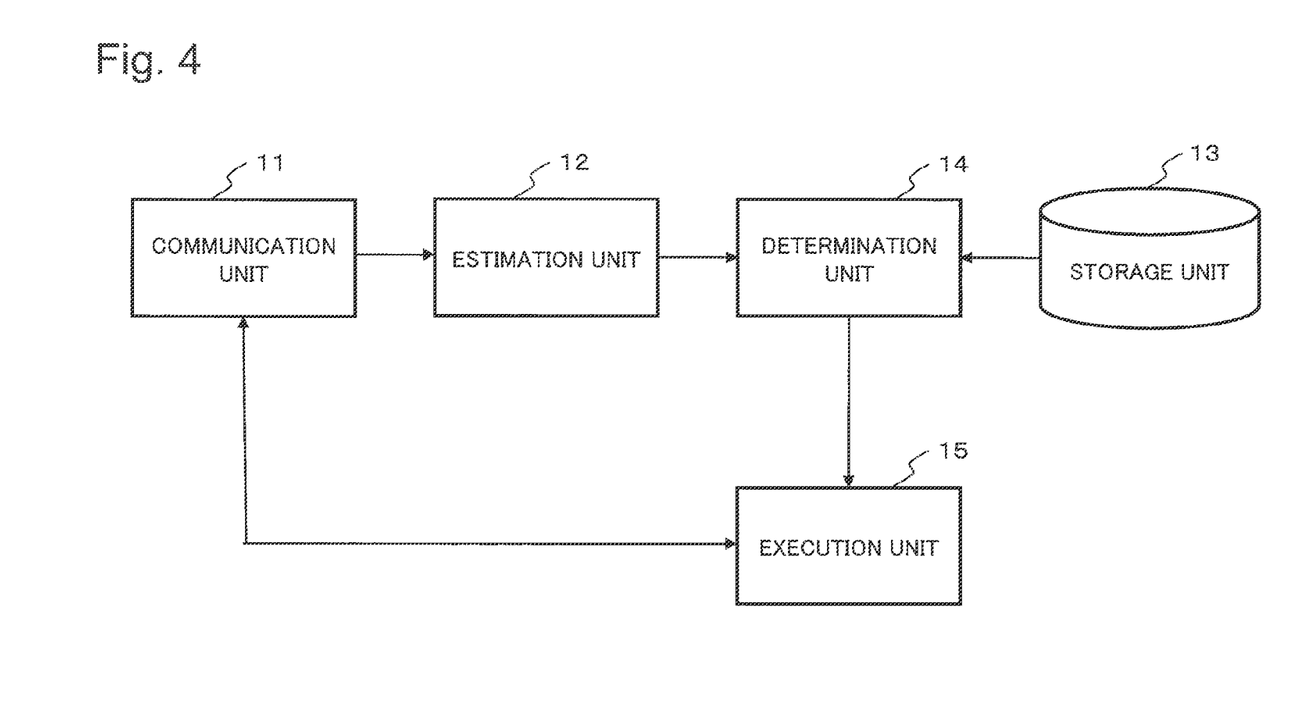
FIG. 4 is a block diagram illustrating a configuration of a first exemplary embodiment of the radio base station according to the present invention.

FIG. 4 is a block diagram illustrating a configuration of the first exemplary embodiment of the radio base station according to the present invention. As illustrated in FIG. 4, each eNB (the eNBs 103 to 105) includes a communication unit 11, an estimation unit 12, a storage unit 13, a determination unit 14, and an execution unit 15.

The communication unit 11 executes transmission/reception of a packet.

The estimation unit 12 estimates a Packet Loss Rate and a Delay Variation in accordance with IP Performance Metrics. Here, the Packet Loss Rate refers to a loss rate of a packet transmitted to an EPC by the communication unit 11. The Delay Variation refers to a magnitude of a Delay Variation of the packet transmitted to the EPC by the communication unit 11. It should be noted that the estimation unit 12 may estimate those other than the Packet Loss Rate and the Delay Variation.

The framework of IP Performance Metrics is described in RFC (Request for comments) 2330. IP Performance Metrics are rules for a technique in which in IP Layer, a packet transmission side estimates a Packet Loss Rate and a Delay Variation of a packet transmitted by the own side and evaluates reliability and performance of a network. It should be noted that as an estimation method for a Packet Loss Rate, for example, a method described in RFC 2680 is used. Further, as an estimation method for a Delay Variation, for example, a method described in RFC 3393 is used.

The storage unit 13 stores information representing a determination algorithm of S1 network load information. Each value of the S1 network load information is determined based on estimation results of a Packet Loss Rate and a Delay Variation. Specifically, each value of the S1 network load information is determined, for example, as any one of "LowLoad," "MediumLoad," "HighLoad," and "Overload."

Figure 5:
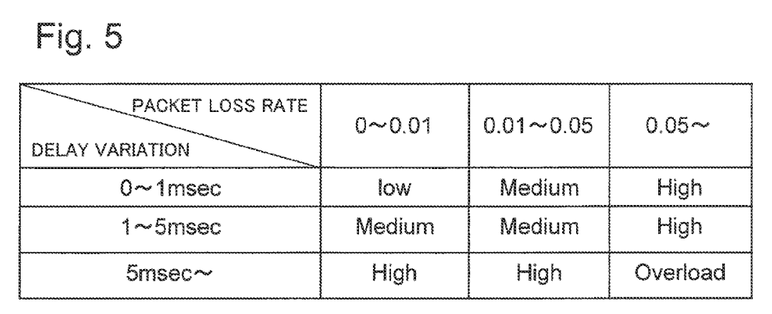
FIG. 5 is an illustrative diagram illustrating one example of information representing a determination algorithm of S1 network load information.

FIG. 5 is an illustrative diagram illustrating one example of information representing a determination algorithm of S1 network load information. As illustrated in FIG. 5, in the present exemplary embodiment, the storage unit 13 stores a table indicating association of a Packet Loss Rate and a Delay Variation with each value of S1 network load information as information representing a determination algorithm of S1 network load information. In the example illustrated in FIG. 5, a Packet Loss Rate is classified into three stages, i.e. smaller than 0.01, equal to or greater than 0.01 and smaller than 0.05, and equal to or greater than 0.05. Further, a Delay Variation is classified into three stages, i.e. smaller than 1 msec, equal to or greater than 1 msec and smaller than 5 msec, and equal to or greater than 5 msec. Here, each value of S1 network load information illustrated in FIG. 5 indicates a backhaul resource load from an eNB to an EPC, i.e. a traffic load in the backhaul 200 illustrated in FIG. 1.

It should be noted that values of a Packet Loss Rate and a Delay Variation corresponding to each value of S1 network load information illustrated in FIG. 5 may be determined on the basis of measurement results of the Packet Loss Rate and the Delay Variation previously measured, for example, in accordance with a state of a backhaul resource load from an eNB to an EPC. Further, values of a Packet Loss Rate and a Delay Variation corresponding to each value of S1 network load information may be changed by an operator in accordance with a configuration of a communication system and the like.

The determination unit 14 determines S1 network load information. Specifically, the determination unit 14 determines a backhaul resource load from its own station to the EPC 100 on the basis of estimation results of a Packet Loss Rate and a Delay Variation in the estimation unit 12 based on information representing the determination algorithm illustrated in FIG. 5. Then, the determination unit 14 sets the determination result as S1 network load information of a RESOURCE STATUS UPDATE message to be transmitted to an adjacent eNB.

The execution unit 15 transmits, to the adjacent eNB, the RESOURCE STATUS UPDATE message including the S1 network load information set with the determination result by the determination unit 14 via the communication unit 11. Further, the execution unit 15 acquires, from the adjacent eNB, a RESOURCE STATUS UPDATE message including S1 network load information via the communication unit 11.

The execution unit 15 executes MLB on the basis of the S1 network load information set with the determination result by the determination unit 14 and the S1 network load information received from the adjacent eNB.

The communication unit 11, the estimation unit 12, the determination unit 14, and the execution unit 15 are realized, for example, using a CPU (Central Processing Unit) of a computer operating in accordance with a traffic load distribution program. The traffic load distribution program is stored on, for example, a storage apparatus (not illustrated) of the computer. The CPU reads the program and operates as the communication unit 11, the estimation unit 12, the determination unit 14, and the execution unit 15 in accordance with the program. Further, the communication unit 11, the estimation unit 12, the determination unit 14, and the execution unit 15 may be realized using separate pieces of hardware, respectively.

Further, the storage unit 13 is realized using a storage apparatus such as a RAM (Random Access Memory) of a computer, or the like.

Next, operations of respective units in the present exemplary embodiment will be described.

Herein, an operation of the eNB 103 representing the eNBs 103 to 105 illustrated in FIG. 1 will be described.

The communication unit 11 of the eNB 103 transmits a packet to the EPC 100. The EPC 100 reports, to the eNB 103, a reception status of the packet transmitted from the eNB 103.

The estimation unit 12 estimates a Packet Loss Rate and a Delay Variation on the basis of the reception status of the packet reported from the EPC 100 via the communication unit 11.

The determination unit 14 determines a value to be set as S1 network load information on the basis of the estimation results of the Packet Loss Rate and the Delay Variation in the estimation unit 12. At that time, the determination unit 14 determines the value to be set as S1 network load information based on information representing the determination algorithm stored on the storage unit 13 as described above.

When, for example, the Packet Loss Rate is 0.03 and the Delay Variation is 3 msec, the determination unit 14 determines a value to be set as S1 network load information as "MediumLoad" using information representing the determination algorithm illustrated in FIG. 5. This determination result indicates that a backhaul resource load from the eNB 103 to the EPC 100 is "MediumLoad."

The execution unit 15 transmits a RESOURCE STATUS UPDATE message including the S1 network load information set with the determination result of the determination unit 14 to an adjacent eNB, for example, the eNB 104 illustrated in FIG. 1 via the communication unit 11.

When the eNBs 104 and 105 illustrated in FIG. 1 each transmit a RESOURCE STATUS UPDATE message using the same method as in the eNB 103, the eNBs can acquire information indicating a backhaul resource load of an adjacent eNB. In other words, the eNBs can share pieces of information indicating backhaul resource loads from respective eNBs to an EPC. Therefore, the execution unit 15 of each eNB can execute MLB considering a backhaul resource load of an aggregation link. In other words, each eNB can designate a cell of an adjacent eNB having a less load with respect to a radio terminal as a handover destination.

As described above, in the present exemplary embodiment, an eNB estimates a Packet Loss Rate and a Delay Variation of a packet transmitted to an EPC and determines S1 network load information indicating a traffic load from the eNB to the EPC on the basis of the estimation results. Thereby, even when a backhaul between an eNB and a mobile core network includes a plurality of links, S1 network load information considering the presence of all of the links can be determined.

Further, in the present exemplary embodiment, the determined S1 network load information is reported to an adjacent eNB. Thereby, eNBs can share pieces of information indicating backhaul resource loads from the respective eNBs to an EPC. Therefore, each eNB can execute MLB considering not only backhaul resources of an access link but also the entire congestion status of backhaul resources including a plurality of links. Therefore, it is possible to cause Handover between eNBs during MLB execution to succeed more certainly. Therefore, congestion between an eNB and an EPC, for example, aggregation link congestion can be avoided. Further, a throughput decrease of a radio terminal can be avoided more certainly.

The present invention is applicable to a communication system including a plurality of radio base stations and a control apparatus that manages backhaul resources.

Figure 6:
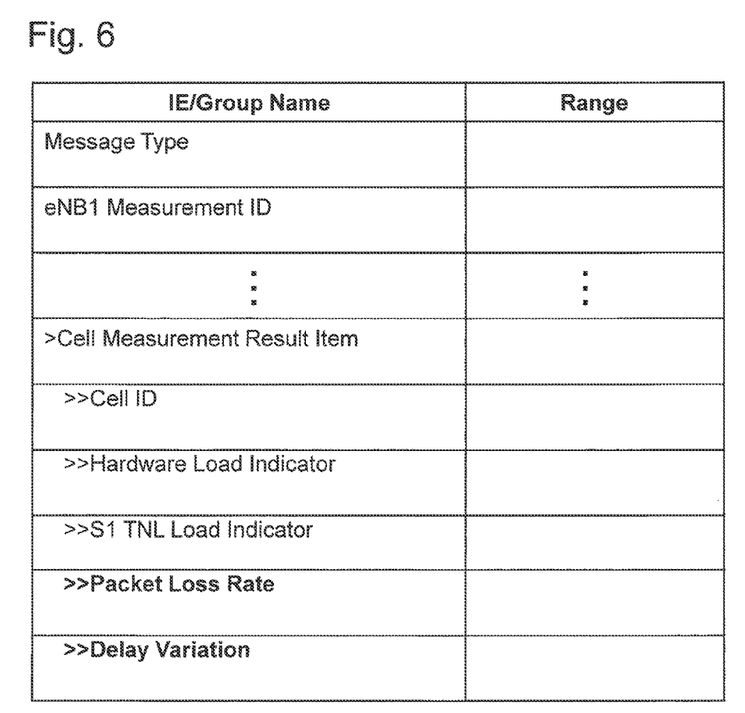
FIG. 6 is an illustrative diagram illustrating a RESOURCE STATUS UPDATE message in which a Packet Loss Rate and a Delay Variation are designated.

It should be noted that in the present exemplary embodiment, a case in which a communication unit reports S1 network load information to an adjacent eNB has been described, but the communication unit may be configured to transmit values of a Packet Loss Rate and a Delay Variation estimated by an estimation unit, together with S1 network load information. For example, as additive IEs (Information Elements) of a RESOURCE STATUS UPDATE message across an X2 link, a "Packet Loss Rate" and a "Delay Variation" may be designated. Then, the communication unit may transmit a RESOURCE STATUS UPDATE message thereof. FIG. 6 is an illustrative diagram illustrating a RESOURCE STATUS UPDATE message in which a Packet Loss Rate and a Delay Variation are designated. According to such a configuration, when, for example, a RESOURCE STATUS UPDATE message is transmitted from the eNB 103 to the eNB 104, the eNB 104 can acquire values of a Packet Loss Rate and a Delay Variation of the eNB 103.

Further, control apparatuses (SON (Self Organizing Network)/EMS (Element Management System)/HeNB-GW (Home eNB-Gateway)) that manage eNBs may collect values of a Packet Loss Rate and a Delay Variation transmitted from an eNB. Then, the control apparatuses may determine a backhaul resource load via association with an index of any one of four stages ("LowLoad," "MediumLoad," "High-Load," and "Overload") in the similar manner as for S1 network load information, on the basis of the values of the Packet Loss Rate and the Delay Variation between the eNB and an EPC.

Further, it is possible that the estimation unit 12 estimates a Packet Loss Rate and a Delay Variation from a traffic from an eNB to SeGW (Security Gateway), a switch, or a router, and the determination unit determines S1 network load information on the basis of the estimation results.

Further, it is possible that the estimation unit 12 estimates a Packet Loss Rate and a Delay Variation between an eNB and an EPC using Ping (Packet INternet Groper) or ECN (Explicit Congestion Notification) described in RFC 3168.

Second Exemplary Embodiment

A second exemplary embodiment of the present invention will be described with reference to the drawings.

A configuration of a radio base station in the second exemplary embodiment is the same as in the first exemplary embodiment.

Figure 7:
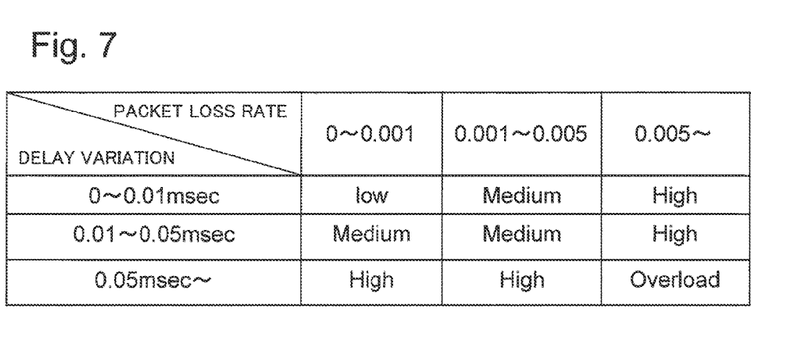
FIG. 7 is an illustrative diagram illustrating one example of information representing a determination algorithm corresponding to a backhaul of an optical line.
Figure 8:
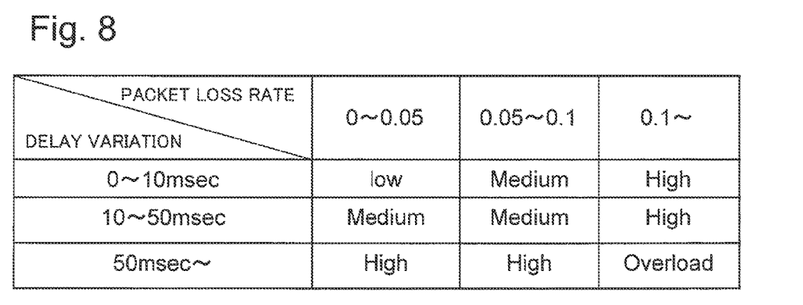
FIG. 8 is an illustrative diagram illustrating one example of information representing a determination algorithm corresponding to a backhaul of a satellite line.

However, a storage unit 13 of the present exemplary embodiment stores information representing a determination algorithm for each type of a link of a backhaul between an eNB and an EPC. In the present exemplary embodiment, the storage unit 13 stores information representing a determination algorithm corresponding to a backhaul of an optical line and information representing a determination algorithm corresponding to a backhaul of a satellite line. FIG. 7 is an illustrative diagram illustrating one example of information representing a determination algorithm corresponding to a backhaul of an optical line. In the example illustrated in FIG. 7, a Packet Loss Rate is classified into three stages, i.e. smaller than 0.001, equal to or greater than 0.001 and smaller than 0.005, and equal to or greater than 0.005. Further, a Delay Variation is classified into three stages, i.e. smaller than 0.01 msec, equal to or greater than 0.01 msec and smaller than 0.05 msec, and equal to or greater than 0.05 msec. FIG. 8 is an illustrative diagram illustrating one example of information representing a determination algorithm corresponding to a backhaul of a satellite line. In the example illustrated in FIG. 8, a Packet Loss Rate is classified into three stages, i.e. smaller than 0.05, equal to or greater than 0.05 and smaller than 0.1, and equal to or greater than 0.1. Further, a Delay Variation is classified into three stages, i.e. smaller than 10 msec, equal to or greater than 10 msec and smaller than 50 msec, and equal to or greater than 50 msec.

Further, a determination unit 14 of the present exemplary embodiment switches a determination algorithm of S1 network load information in accordance with a type of a link of a backhaul. When, for example, a link of a backhaul is an optical line, S1 network load information is determined on the basis of the information illustrated in FIG. 7. Further, when, for example, a link of a backhaul is a satellite line, S1 network load information is determined on the basis of the information illustrated in FIG. 8.

In this manner, in the present exemplary embodiment, the eNB 103 estimates a Packet Loss Rate and a Delay Variation of a packet transmitted to the EPC 100 in accordance with a type of a link of a backhaul and determines S1 network load information on the basis of the estimation results.

It should be noted that when it is possible for a communication unit 11 to acquire information indicating a type of a link of a backhaul from a relay apparatus or the like, the communication unit 11 may determine a type of a link of a backhaul on the basis of the information and report the determination result to the determination unit 14. Further, an operator or the like may specify in advance a type of a link of a backhaul for the determination unit 14 via an operation unit (not illustrated) of an eNB.

In the present exemplary embodiment, a determination algorithm of S1 network load information is switched in accordance with a type of a backhaul line, and therefore the same advantageous effect as in the first exemplary embodiment can be obtained and a value of S1 network load information corresponding to a type of an in-use backhaul line can be determined. In other words, a value of S1 network load information can be determined on the basis of a packet loss and a delay variation likely to actually occur in an in-use backhaul line.

It should be noted that also in the present exemplary embodiment, control apparatuses (SON/EMS/HeNB-GW) that manage eNBs may estimate a Packet Loss Rate and a Delay Variation from a traffic from an eNB to SeGW, a switch, or a router and determine a value of S1 network load information on the basis of the estimation results.

Figure 9:
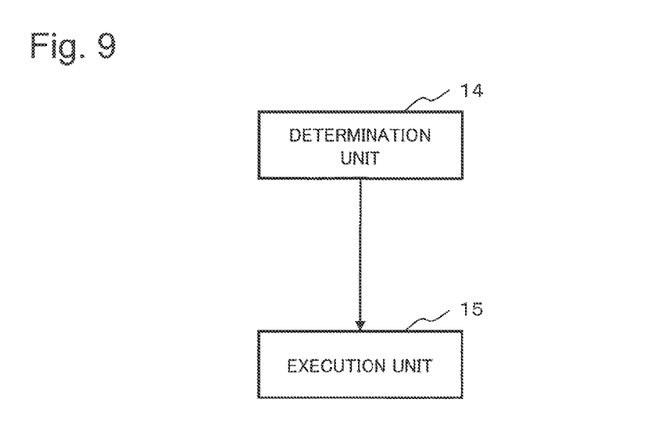
FIG. 9 is a block diagram illustrating a minimal configuration of the radio base station according to the present invention.

Next, an outline of the present invention will be described. FIG. 9 is a block diagram illustrating a minimal configuration of the radio base station according to the present invention. The radio base station according to the present invention includes: a determination unit 14 that determines network load information indicating a traffic load in a backhaul between an own station and a core network; and an execution unit 15 that executes distribution of traffic loads among radio base stations on the basis of the network load information determined by the determination unit 14 and network load information received from an adjacent radio base station.

According to such a configuration, even when a backhaul between an eNB and a mobile core network includes a plurality of links, a backhaul resource load considering the presence of all of the links can be determined. Thereby, MLB can be executed by considering not only backhaul resources in an access link but also the entire congestion status of backhaul resources including a plurality of links.

Further, the radio base station according to the present invention may include an estimation unit 12 (see FIG. 4) that estimates a loss rate and a Delay Variation of a packet transmitted from an own station to a core network. Then, the determination unit 14 may determine a traffic load in a backhaul between the own station and the core network on the basis of the estimation results of the estimation unit 12 and designate the determination result as network load information. According to such a configuration, when a result obtained by analyzing a packet travelling between an own station and a core network is used to determine a traffic load, a traffic load in a backhaul between the own station and the core network can be determined more accurately.

Further, the radio base station according to the present invention may include a storage unit 13 (see FIG. 4) that stores information representing a determination algorithm for determining, on the basis of a loss rate and a Delay Variation of a packet transmitted from an own station to a core network, a traffic load in a backhaul between the own station and the core network. Then, the determination unit 14 may determine a traffic load in the backhaul between the own station and the core network on the basis of estimation results of the estimation unit 12 based on the determination algorithm. According to such a configuration, on the basis of a loss rate and a Delay Variation of a packet transmitted from an own station to a core network, a traffic load, i.e. S1 network load information in a backhaul between the own station and the core network can be certainly determined. Further, when in accordance with a configuration of a communication system or the like, an operator changes a determination algorithm to be used among a plurality of types of determination algorithms stored on the storage unit 13, the determination unit 14 can determine a traffic load more accurately.

Further, the execution unit 15 may transmit network load information determined by the determination unit 14 to an adjacent radio base station. According to such a configuration, eNBs can share pieces of information indicating backhaul resource loads from the respective eNBs to an EPC. Therefore, each eNB can execute MLB by considering not only backhaul resources of an access link but also the entire congestion status of backhaul resources including a plurality of links. Therefore, it is possible to cause Handover between eNBs during MLB execution to succeed more certainly. Therefore, congestion between an eNB and an EPC can be avoided. Further, a throughput decrease of a radio terminal can be avoided more certainly.

Further, the execution unit 15 may transmit a loss rate and a Delay Variation of a packet estimated by the estimation unit 12 to an adjacent radio base station, together with network load information. According to such a configuration, a radio base station can determine, for example, on the basis of values of a loss rate and a Delay Variation of a packet received from another radio base station, a backhaul resource load from the another radio base station to an EPC based on a determination algorithm stored on the own station.

Further, it is possible that the storage unit 13 stores information representing a determination algorithm for each type of a backhaul line and the determination unit 14 determines network load information based on a determination algorithm corresponding to a type of a backhaul line used by an own station. According to such a configuration, MLB corresponding to a type of a backhaul line used by an own station can be executed. Thereby, congestion between an eNB and an EPC can be avoided more certainly. Further, a throughput decrease of a radio terminal can be avoided more certainly.

Further, the execution unit 15 may execute Handover on the basis of network load information determined by the determination unit 14 and network load information received from an adjacent radio base station and cause a radio terminal located in a cell of an own station to be located in a cell of an adjacent radio base station where a traffic load indicated by the received network load information is smaller. According to such a configuration, a radio terminal can be located in a cell of an adjacent eNB where a traffic load in a backhaul between the eNB and a core network is smaller. Thereby, backhaul congestion and a throughput decrease of a radio terminal can be avoided more certainly.

The whole or part of the exemplary embodiments disclosed above can be described as, but not limited to, the following supplementary notes.

(Supplementary Note 1) A radio base station comprising: a determination means for determining network load information indicating a traffic load in a backhaul between an own station and a core network; and an execution means for executing distribution of traffic loads among radio base stations on the basis of the network load information determined by the determination means and network load information received from an adjacent radio base station.

(Supplementary Note 2) The radio base station according to Supplementary Note 1, further comprising: an estimation means for estimating a loss rate and a Delay Variation of a packet transmitted from an own station to a core network, wherein the determination means determines, on the basis of the estimation results of the estimation means, a traffic load in a backhaul between the own station and the core network and designates the determination result as network load information.

(Supplementary Note 3) The radio base station according to Supplementary Note 2, wherein the execution means transmits the loss rate and the Delay Variation of the packet estimated by the estimation means to an adjacent radio base station, together with the network load information.

(Supplementary Note 4) The radio base station according to Supplementary Note 2 or Supplementary Note 3, further comprising: a storage means for storing information representing a determination algorithm for determining, on the basis of a loss rate and a Delay Variation of a packet transmitted from an own station to a core network, a traffic load in a backhaul between the own station and the core network, wherein the determination means determines, based on the determination algorithm, a traffic load in a backhaul between an own station and a core network on the basis of estimation results of the estimation means.

(Supplementary Note 5) The radio base station according to Supplementary Note 4, wherein the storage means stores information representing a determination algorithm for each type of a backhaul line, and the determination means determines network load information using a determination algorithm corresponding to a type of a backhaul line used by an own station.

(Supplementary Note 6) The radio base station according to any one of Supplementary Note 1 to Supplementary Note 5, wherein the execution means transmits the network load information determined by the determination means to an adjacent radio base station.

(Supplementary Note 7) The radio base station according to any one of Supplementary Note 1 to Supplementary Note 6, wherein the execution means executes Handover on the basis of the network load information determined by the determination means and network load information received from the adjacent radio base station and causes a radio terminal located in a cell of an own station to be located in a cell of an adjacent radio base station where a traffic load indicated by the received network load information is smaller.

(Supplementary Note 8) The radio base station according to any one of Supplementary Note 2 to Supplementary Note 7, wherein the determination means determines a traffic load in a backhaul between an own station and a core network via association with an index of "S1 TNL Load" in a RESOURCE STATUS UPDATE message defined by technical specifications (TS 36.423 Version 11.5.0).

(Supplementary Note 9) The radio base station according to any one of Supplementary Note 2 to Supplementary Note 8, wherein the estimation means estimates a loss rate and a Delay Variation of a packet transmitted from an own station to SeGW, a switch, or a router.

(Supplementary Note 10) The radio base station according to any one of Supplementary Note 2 to Supplementary Note 9, wherein the estimation means estimates a Packet Loss Rate and a Delay Variation between a radio base station and an EPC using Ping or ECN.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-222924, filed on Oct. 28, 2013, the disclosure of which is incorporated herein in its entirety by reference.

REFERENCE SIGNS LIST

11 Communication unit
12 Estimation unit
13 Storage unit
14 Determination unit
15 Execution unit
100 EPC
101, 102 Relay apparatus
103, 104, 105 eNB
106 Radio terminal
107, 108, 109 Cell
111, 112, 113, 114, 115 Link
200 Backhaul

The invention claimed is:

1. A radio base station comprising:
a determination unit for determining network load information indicating a traffic load in a backhaul between an own station and a core network;
an execution unit for executing distribution of traffic loads among radio base stations on the basis of the network load information determined by the determination unit and network load information received from an adjacent radio base station; and
an estimation unit for estimating a loss rate and a Delay Variation of a packet transmitted from an own station to a core network, wherein
the determination unit determines, on the basis of the estimation results of the estimation unit, a traffic load in a backhaul between the own station and the core network and designates the determination result as network load information, and
the execution unit transmits the loss rate and the Delay Variation of the packet estimated by the execution unit to an adjacent radio base station, together with the network load information.

2. The radio base station according to claim 1, wherein the execution unit transmits the network load information determined by the determination unit to an adjacent radio base station.

3. The radio base station according to claim 1, wherein the execution unit executes Handover on the basis of the network load information determined by the determination unit and network load information received from the adjacent radio base station and causes a radio terminal located in a cell of an own station to be located in a cell of an adjacent radio base station where a traffic load indicated by the received network load information is smaller.

4. The radio base station according to claim 1, further comprising
a storage unit for storing information representing a determination algorithm for determining, on the basis of a loss rate and a Delay Variation of a packet transmitted from an own station to a core network, a traffic load in a backhaul between the own station and the core network, wherein
the determination unit determines, based on the determination algorithm, a traffic load in a backhaul between an own station and a core network on the basis of estimation results of the estimation unit.

5. The radio base station according to claim 4, wherein the storage unit stores information representing a determination algorithm for each type of a backhaul line, and
the determination unit determines network load information using a determination algorithm corresponding to a type of a backhaul line used by an own station.

6. A traffic load distribution method comprising:
determining network load information indicating a traffic load in a backhaul between an own station and a core network;
executing distribution of traffic loads among radio base stations on the basis of the determined network load information and network load information received from an adjacent radio base station; and
estimating a loss rate and a Delay Variation of a packet transmitted from an own station to a core network, wherein
on the basis of the estimated loss rate and the estimated Delay Variation of the packet, a traffic load in a backhaul between the own station and the core network is determined and the determination result is designated as network load information, and
the estimated loss rate and the estimated Delay Variation of the packet are transmitted to an adjacent radio base station, together with the network load information.

7. A non-transitory storage medium storing a traffic load distribution program that causes a computer to execute:
processing for determining network load information indicating a traffic load in a backhaul between an own station and a core network;
processing for executing distribution of traffic loads among radio base stations on the basis of the determined network load information and network load information received from an adjacent radio base station; and
processing for estimating a loss rate and a Delay Variation of a packet transmitted from an own station to a core network, wherein
on the basis of the estimated loss rate and the estimated Delay Variation of the packet, a traffic load in a backhaul between the own station and the core network is determined and the determination result is designated as network load information, and the estimated loss rate and the estimated Delay Variation of the packet are transmitted to an adjacent radio base station, together with the network load information.

* * * * *